United States Patent
Shafer

(10) Patent No.: US 11,772,887 B2
(45) Date of Patent: Oct. 3, 2023

(54) DISPOSABLE SHEATH FOR OIL FILTER REMOVAL AND CONTAINMENT

(71) Applicant: Cap Shafer, Anchor Point, AK (US)

(72) Inventor: Cap Shafer, Anchor Point, AK (US)

( * ) Notice: Subject to any disclaimer, the term of this patent is extended or adjusted under 35 U.S.C. 154(b) by 0 days.

(21) Appl. No.: 18/052,741

(22) Filed: Nov. 4, 2022

(65) Prior Publication Data

US 2023/0086823 A1    Mar. 23, 2023

Related U.S. Application Data

(62) Division of application No. 16/804,333, filed on Feb. 28, 2020, now Pat. No. 11,492,195.

(51) Int. Cl.
| | |
|---|---|
| *B65F 1/00* | (2006.01) |
| *B01D 29/31* | (2006.01) |
| *B25B 27/00* | (2006.01) |
| *B01D 35/31* | (2006.01) |
| *F16N 31/00* | (2006.01) |
| *F01M 11/03* | (2006.01) |
| *B01D 35/00* | (2006.01) |

(52) U.S. Cl.
CPC ............ *B65F 1/0006* (2013.01); *B01D 29/31* (2013.01); *B25B 27/0042* (2013.01); *B01D 35/005* (2013.01); *B01D 35/31* (2013.01); *B01D 2201/24* (2013.01); *B65F 2240/152* (2013.01); *F01M 11/03* (2013.01); *F16N 31/00* (2013.01)

(58) Field of Classification Search
None
See application file for complete search history.

(56) References Cited

U.S. PATENT DOCUMENTS

| | | | | |
|---|---|---|---|---|
| 2,586,674 | A | * | 2/1952 | Friedrich ................... A61F 6/04 D24/105 |
| 3,358,141 | A | | 12/1967 | Hoffmann et al. |
| 3,385,141 | A | * | 5/1968 | Benton ............... B25B 27/0042 81/111 |
| 3,659,599 | A | * | 5/1972 | McLaughlin ..... A61F 13/00021 602/52 |
| 3,710,930 | A | * | 1/1973 | Owdom ................. B01D 35/16 220/8 |
| 3,809,090 | A | * | 5/1974 | Povlacs ..................... A61F 6/04 604/347 |
| 3,874,478 | A | * | 4/1975 | Mantell, Jr. ........ F01M 11/0408 251/144 |

(Continued)

FOREIGN PATENT DOCUMENTS

KR    1020180075078 A    7/2018

*Primary Examiner* — Robert J Popovics
(74) *Attorney, Agent, or Firm* — McKee, Voorhees & Sease, PLC

(57) ABSTRACT

A disposable oil filter containment sheath is provided for use during oil changes for combustion engines. The sheath has a closed bottom, a cylindrical sidewall, and an open top. The resilient sheath is rolled to an initial collapsed position for placement on the bottom of an oil filter mounted on the engine, and it is partially unrolled along the filter. The filter can then be loosened to allow oil to drain into the sheath for capturing a reservoir. After the filter is removed from the engine, the sheath is completely unrolled and tied at the top so as to fully enclose and contain the oil filter and oil. The sheath and its contents are then ready for disposal.

4 Claims, 2 Drawing Sheets

(56) References Cited

U.S. PATENT DOCUMENTS

| | | | | |
|---|---|---|---|---|
| 3,912,633 A * | 10/1975 | Delaney | B01D 35/16 | |
| | | | 210/DIG. 17 | |
| 4,020,922 A * | 5/1977 | Klasel | B01D 35/31 | |
| | | | 383/106 | |
| D246,117 S * | 10/1977 | Okamoto | D24/105 | |
| 4,177,529 A * | 12/1979 | Sikula, Jr. | B01D 27/00 | |
| | | | 141/330 | |
| 4,230,002 A | 10/1980 | Skidmore | | |
| 4,266,452 A * | 5/1981 | Crist | B25B 13/06 | |
| | | | 7/100 | |
| 4,376,703 A * | 3/1983 | Krauss | B01D 35/31 | |
| | | | 220/737 | |
| 4,450,964 A | 5/1984 | Wood | | |
| 4,451,368 A * | 5/1984 | Pandelena | B01D 35/31 | |
| | | | 210/248 | |
| 4,485,853 A * | 12/1984 | Gunderson | F01M 11/0408 | |
| | | | 141/97 | |
| 4,625,716 A * | 12/1986 | Pomeranz | A61F 6/04 | |
| | | | 600/40 | |
| 4,763,620 A * | 8/1988 | Zastocki | B01D 35/31 | |
| | | | 123/198 R | |
| 4,800,933 A * | 1/1989 | Moore | B25B 27/0042 | |
| | | | 141/331 | |
| 4,865,727 A * | 9/1989 | Krauss | B01D 35/30 | |
| | | | 210/DIG. 17 | |
| 4,867,017 A * | 9/1989 | Holman | B25B 27/0042 | |
| | | | 81/120 | |
| 4,877,155 A * | 10/1989 | Tull | B67D 7/04 | |
| | | | 141/332 | |
| 4,882,051 A | 11/1989 | Itoh | | |
| 4,913,813 A * | 4/1990 | Covarrubias | F16N 31/00 | |
| | | | 210/232 | |
| 4,917,113 A | 4/1990 | Conway et al. | | |
| 4,919,149 A * | 4/1990 | Stang | A61F 6/04 | |
| | | | 600/38 | |
| RE33,206 E | 5/1990 | Conway et al. | | |
| 4,929,356 A | 5/1990 | Todd | | |
| 4,934,382 A | 6/1990 | Barone, Jr. | | |
| 4,970,817 A * | 11/1990 | Mansfield | B67C 11/02 | |
| | | | 141/330 | |
| 5,074,379 A * | 12/1991 | Batrice | F01M 11/0408 | |
| | | | 123/196 R | |
| 5,109,871 A * | 5/1992 | Thornton | A61F 6/04 | |
| | | | 128/842 | |
| 5,121,776 A * | 6/1992 | Kovach | F01M 11/0408 | |
| | | | 383/41 | |
| 5,139,658 A | 8/1992 | Hodge | | |
| 5,163,448 A * | 11/1992 | Foldesy | A61F 6/04 | |
| | | | 128/918 | |
| 5,169,541 A * | 12/1992 | Wells | B01D 35/31 | |
| | | | 210/232 | |
| 5,176,666 A | 1/1993 | Conway et al. | | |
| 5,196,112 A * | 3/1993 | Eichman | F01M 11/0408 | |
| | | | 210/DIG. 17 | |
| 5,271,299 A * | 12/1993 | Wadsworth | F16N 33/00 | |
| | | | 7/100 | |
| 5,316,386 A | 5/1994 | Moore | | |
| 5,320,145 A * | 6/1994 | Avino | B61C 17/08 | |
| | | | 141/97 | |
| 5,334,175 A | 8/1994 | Conway et al. | | |
| 5,366,084 A * | 11/1994 | Post | B01D 35/31 | |
| | | | 206/319 | |
| 5,366,400 A * | 11/1994 | Kucik | B63J 4/00 | |
| | | | 210/DIG. 17 | |
| 5,386,748 A * | 2/1995 | Kilgore | B25B 27/0042 | |
| | | | 81/180.1 | |
| 5,390,823 A * | 2/1995 | Kilgore | B67B 7/26 | |
| | | | 30/124 | |
| 5,421,223 A * | 6/1995 | Wawrzyniak | B25B 27/0042 | |
| | | | 81/3.4 | |
| 5,425,379 A * | 6/1995 | Broad, Jr. | A61H 19/40 | |
| | | | 128/842 | |
| 5,425,401 A * | 6/1995 | Boggs | B01D 41/04 | |
| | | | 220/571 | |
| 5,431,588 A * | 7/1995 | Kucik | F01M 11/0408 | |
| | | | 210/DIG. 17 | |
| 5,432,954 A * | 7/1995 | Taylor | A41D 19/01594 | |
| | | | 2/161.6 | |
| D363,501 S * | 10/1995 | Daniel | D15/150 | |
| 5,454,960 A | 10/1995 | Newsom | | |
| 5,467,781 A * | 11/1995 | Kato | A61F 6/04 | |
| | | | 128/918 | |
| 5,469,935 A * | 11/1995 | Hewuse | F16N 31/002 | |
| | | | 141/86 | |
| 5,482,093 A | 1/1996 | Tremonti et al. | | |
| 5,513,652 A * | 5/1996 | Schwartz | A61F 5/41 | |
| | | | 128/842 | |
| 5,549,120 A | 8/1996 | Persson et al. | | |
| 5,598,951 A * | 2/1997 | DeBano, Jr. | B67C 11/02 | |
| | | | 222/88 | |
| 5,623,755 A * | 4/1997 | Childress | F16N 31/002 | |
| | | | 210/248 | |
| 5,626,149 A * | 5/1997 | Schwartz | A61F 5/41 | |
| | | | 600/38 | |
| 5,655,624 A | 8/1997 | Kelly, Jr. | | |
| 5,667,699 A | 9/1997 | Schlise | | |
| 5,694,990 A * | 12/1997 | Crima | F01M 11/0408 | |
| | | | 141/330 | |
| 5,706,873 A | 1/1998 | Benoit et al. | | |
| 5,722,508 A | 3/1998 | Kraus | | |
| 5,782,276 A * | 7/1998 | Kilgore | F16N 31/002 | |
| | | | 141/330 | |
| 5,785,850 A | 7/1998 | Lynch et al. | | |
| 5,857,503 A | 1/1999 | Vreeken | | |
| 5,885,205 A * | 3/1999 | Kassman | A61F 5/41 | |
| | | | 600/38 | |
| 5,924,342 A | 7/1999 | Chou | | |
| 5,944,034 A | 8/1999 | McRae et al. | | |
| 6,007,836 A * | 12/1999 | Denzer | A61K 9/0034 | |
| | | | 600/38 | |
| 6,033,578 A | 3/2000 | Loewen | | |
| 6,056,874 A * | 5/2000 | Goodman | F16N 31/002 | |
| | | | 141/330 | |
| D434,138 S * | 11/2000 | DeVries | D24/105 | |
| 6,227,078 B1 * | 5/2001 | Lemmo, Jr. | B25B 27/0042 | |
| | | | 81/3.4 | |
| 6,248,237 B1 * | 6/2001 | Mery | B01D 46/0098 | |
| | | | 55/357 | |
| 6,325,247 B1 | 12/2001 | Iggulden | | |
| 6,349,751 B1 * | 2/2002 | Gowans | C25C 7/06 | |
| | | | 141/110 | |
| 6,355,169 B1 * | 3/2002 | Smith | B01D 35/306 | |
| | | | 210/DIG. 17 | |
| 6,401,574 B1 * | 6/2002 | Myers | B25B 27/0042 | |
| | | | 7/100 | |
| 6,488,848 B1 * | 12/2002 | Smith | F01M 11/03 | |
| | | | 210/453 | |
| D474,382 S * | 5/2003 | Tsai | D8/29 | |
| 6,569,083 B1 * | 5/2003 | Kassman | A61F 6/04 | |
| | | | 600/38 | |
| 6,569,320 B1 * | 5/2003 | Bedi | F02M 37/16 | |
| | | | 210/259 | |
| 6,616,838 B1 * | 9/2003 | Harris | B01D 35/31 | |
| | | | 210/DIG. 17 | |
| 6,651,668 B1 * | 11/2003 | Praml | A61F 6/04 | |
| | | | 128/844 | |
| 6,666,968 B2 * | 12/2003 | Smith | B01D 29/15 | |
| | | | 210/DIG. 17 | |
| 6,769,516 B2 * | 8/2004 | Carlson | F16N 31/002 | |
| | | | 141/331 | |
| 6,818,125 B2 * | 11/2004 | Smith | B01D 29/908 | |
| | | | 210/512.1 | |
| 7,107,878 B1 * | 9/2006 | Jerantowski | B25B 27/0042 | |
| | | | 81/3.4 | |
| 7,147,013 B2 * | 12/2006 | Zulauf | B01D 35/31 | |
| | | | 141/97 | |
| 7,156,067 B1 * | 1/2007 | Gottschalk | B25B 27/0042 | |
| | | | 123/196 R | |

(56) References Cited

U.S. PATENT DOCUMENTS

| | | | | |
|---|---|---|---|---|
| 7,241,385 B1 * | 7/2007 | Cline | B01D 35/30 | 210/232 |
| 7,340,979 B2 * | 3/2008 | Sawyer | B25B 27/0042 | 81/3.4 |
| 7,662,285 B2 * | 2/2010 | Bilski | B01D 35/31 | 210/DIG. 17 |
| 7,846,330 B2 * | 12/2010 | Nelson | B01D 27/08 | 83/660 |
| 8,002,002 B2 * | 8/2011 | Knoll | B01D 35/31 | 141/330 |
| 8,343,345 B1 * | 1/2013 | Perryman, Jr. | B01D 35/31 | 210/DIG. 17 |
| 8,443,809 B2 * | 5/2013 | Hui | A61F 6/04 | 604/350 |
| 8,522,415 B2 * | 9/2013 | Macey | B01D 27/08 | 210/248 |
| 8,578,975 B2 | 11/2013 | Ernst | | |
| D697,539 S | 1/2014 | Ernst | | |
| 8,627,987 B2 * | 1/2014 | Pollack | B65D 83/0027 | 222/386 |
| 8,651,110 B2 * | 2/2014 | Hui | A61F 6/04 | 604/350 |
| 8,651,134 B1 * | 2/2014 | Kurtz | F16N 31/00 | 141/330 |
| 9,003,929 B2 | 4/2015 | Laurel | | |
| 9,127,801 B1 * | 9/2015 | Irwin | F16N 31/00 | |
| 9,291,306 B2 * | 3/2016 | Conlan | F16M 13/02 | |
| 9,351,866 B1 * | 5/2016 | Resnic | A61F 6/04 | |
| D774,638 S * | 12/2016 | Sedic | D24/105 | |
| 9,517,133 B2 * | 12/2016 | George | A61F 2/26 | |
| 9,616,362 B2 | 4/2017 | Johnson et al. | | |
| 9,675,914 B2 | 6/2017 | Rivera et al. | | |
| 10,040,010 B1 * | 8/2018 | Mauroza | B01D 35/31 | |
| 10,065,298 B1 * | 9/2018 | Winscott | B25B 27/0042 | |
| 10,350,738 B2 * | 7/2019 | Sapp | B25B 27/0042 | |
| D859,633 S * | 9/2019 | Ham | F01M 11/0408 | D24/105 |
| 10,518,394 B2 * | 12/2019 | Quick | B01D 29/96 | |
| 10,527,229 B2 * | 1/2020 | Hiebert | F01M 11/04 | |
| 10,711,545 B2 | 7/2020 | Babri et al. | | |
| D912,713 S * | 3/2021 | Moran | D15/150 | |
| D912,714 S * | 3/2021 | Moran | D15/150 | |
| 11,098,621 B2 | 8/2021 | Tilbury | | |
| 11,110,397 B2 | 9/2021 | Whitaker et al. | | |
| 11,154,968 B2 * | 10/2021 | Moran | B25B 13/5008 | |
| 11,311,992 B2 * | 4/2022 | Owens | B25B 13/06 | |
| 11,383,363 B2 | 7/2022 | Niles | | |
| 11,459,919 B1 * | 10/2022 | Stewart | F01M 11/0408 | |
| 11,486,280 B2 * | 11/2022 | Pewett | F01M 11/0408 | |
| 11,492,195 B2 * | 11/2022 | Shafer | B01D 29/31 | |
| 11,549,411 B2 * | 1/2023 | Pewett | B01D 35/005 | |
| 11,643,951 B1 * | 5/2023 | Quinones | F01M 1/10 | 210/248 |
| 2003/0062221 A1 * | 4/2003 | Burrow | B25B 27/0042 | 184/1.5 |
| 2004/0055827 A1 * | 3/2004 | Carlson | F16N 31/002 | 184/106 |
| 2004/0226878 A1 * | 11/2004 | Higgins | B01D 35/31 | 210/443 |
| 2005/0067343 A1 * | 3/2005 | Zulauf | B01D 35/31 | 210/443 |
| 2005/0076917 A1 | 4/2005 | Wray et al. | | |
| 2006/0004332 A1 | 1/2006 | Marx | | |
| 2006/0053983 A1 * | 3/2006 | Groetsch | B25B 27/0042 | 81/121.1 |
| 2006/0096808 A1 * | 5/2006 | Rosenbaum | F01M 11/04 | 184/1.5 |
| 2007/0221585 A1 * | 9/2007 | Vozar | B01D 46/24 | 210/767 |
| 2008/0234642 A1 | 9/2008 | Patterson et al. | | |
| 2008/0276763 A1 * | 11/2008 | Greenberg | B25B 27/0042 | 81/121.1 |
| 2009/0101597 A1 * | 4/2009 | Bilski | B01D 35/31 | 210/248 |
| 2009/0218273 A1 * | 9/2009 | Pummill | B01D 35/31 | 210/248 |
| 2010/0084026 A1 * | 4/2010 | Knoll | B01D 35/31 | 222/1 |
| 2010/0108191 A1 | 5/2010 | Ernst | | |
| 2011/0225786 A1 * | 9/2011 | Macey | B01D 35/31 | 210/440 |
| 2012/0103465 A1 * | 5/2012 | Paluncic | F01M 11/0458 | 141/325 |
| 2012/0186690 A1 * | 7/2012 | Broadway | F16N 39/06 | 141/98 |
| 2012/0198970 A1 * | 8/2012 | Robidoux | B01D 35/31 | 81/121.1 |
| 2013/0161223 A1 * | 6/2013 | Tessier | F16N 31/00 | 206/525 |
| 2013/0206244 A1 * | 8/2013 | Laurel | B25B 27/0042 | 137/15.01 |
| 2013/0298509 A1 * | 11/2013 | Magno, Jr. | B01D 49/00 | 55/428 |
| 2014/0310937 A1 * | 10/2014 | Kioko | B25B 27/0042 | 81/64 |
| 2015/0122822 A1 * | 5/2015 | Saffelle | F16N 31/002 | 220/573 |
| 2015/0201604 A1 * | 7/2015 | Cao | A01M 1/2055 | 43/132.1 |
| 2015/0323131 A1 * | 11/2015 | Conlan | F16M 13/02 | 248/215 |
| 2016/0069513 A1 * | 3/2016 | Knoll | F16N 31/00 | 137/15.14 |
| 2016/0303719 A1 * | 10/2016 | Klamm | B25B 27/0042 | |
| 2016/0325417 A1 | 11/2016 | Klamm | | |
| 2017/0049608 A1 | 2/2017 | Chiaokun et al. | | |
| 2017/0165820 A1 * | 6/2017 | Leo | B01D 35/31 | |
| 2018/0050284 A1 | 2/2018 | Mahdjoubi Namin et al. | | |
| 2018/0094771 A1 | 4/2018 | Hiebert | | |
| 2019/0210202 A1 * | 7/2019 | Quick | B01D 35/31 | |
| 2021/0244142 A1 | 8/2021 | Arrouart | | |
| 2021/0269235 A1 * | 9/2021 | Shafer | B25B 27/0042 | |
| 2021/0364110 A1 | 11/2021 | Burns et al. | | |
| 2021/0404354 A1 * | 12/2021 | Pewett | F01M 11/0458 | |
| 2022/0074326 A1 | 3/2022 | Stenersen et al. | | |
| 2022/0120201 A1 * | 4/2022 | Pewett | F01M 11/0458 | |
| 2023/0086823 A1 * | 3/2023 | Shafer | B01D 29/31 | |

* cited by examiner

US 11,772,887 B2

DISPOSABLE SHEATH FOR OIL FILTER REMOVAL AND CONTAINMENT

CROSS REFERENCE TO RELATED APPLICATIONS

This is a divisional patent application which claims priority under 35 U.S.C. § 120 to U.S. Ser. No. 16/804,333, filed Feb. 28, 2020, herein incorporated by reference in its entirety, including without limitation, the specification, claims, and abstract, as well as any figures, tables, appendices, or drawings thereof.

TECHNICAL FIELD

The invention relates to a device for use in removing and disposing of oil filters, and particularly a disposable containment sheath which rolls onto and encases the oil filter.

BACKGROUND

Combustion engines normally use oil as a cooling and lubricating medium. The oil has a limited life and must be replaced periodically with fresh oil. An oil filter on the engine helps extend the life of the oil, but also should be replaced when the oil is changed. Often, a tool must be used to loosen the filter. Once the oil seal is broken, oil leakage and dripping are common. Some oil filters are located in a position where it is difficult to place a catch pan. The oil also tends to drip onto other vehicle components adjacent the oil filter. Leaking and spilled oil is messy, difficult to clean up, and presents health and safety concerns to the person changing the oil, particularly when the oil is hot. Clean up of spilled oil also requires consumable products, which also must then be disposed. Thus, the oil changing process entails personal and environmental safety issues.

Commercial products are available to assist in removal of the oil filter. Some such products include reservoirs or channels for capturing the used oil. Since filters are vehicle specific, and come in many different sizes and shapes, the removal tools are often designed to fit one specific filter size, and are intended to be reusable tools, rather than disposable products. These tools also do not fully capture and contain the leaking oil during removal of the filter.

Therefore, there is a need for an improved device and method for containing an oil filter and used oil during an oil change for an internal combustion engine.

Accordingly, a primary objective of the present invention is the provision of a disposable sheath to assist in removing an oil filter, collecting used oil, and encasing the oil filter and used oil after the filter is removed from the engine.

A further objective of the present invention is the provision of a rollable sheath that grips an oil filter, contains dripping oil, and can be closed around the removed filter.

Still another objective of the present invention is a provision of a resilient sheath which eliminates or minimizes cleanup requirements after an oil change for an internal combustion engine.

Yet another objective of the present invention is a provision of a stretchable sheath which facilitates removal of an oil filter from an engine, captures oil leaking or dripping from the filter and/or engine, and is closed around the filter after the filter is removed.

A further objective of the present invention is a provision of a disposable oil filter containment sheath which is economical to manufacture, and durable and safe in use.

These and other objectives will become apparent from the following description of the invention.

SUMMARY

The oil filter sheath of the present invention is made of a resilient, stretchable material so that the sheath can be in an initial rolled down configuration, and then is partially rolled up on the oil filter. The sheath has a body with a closed bottom, a cylindrical sidewall, and an open top. The sheath includes a lower reservoir, with channels in the sidewall to direct leaking or dripping oil to the reservoir. After the filter is removed from the engine, the sidewall of the sheath is further rolled upwardly so to enclose the filter. The top of the sheath can be tied to enclose the filter and collected oil for easy disposal.

In use, the oil filter is cracked loose, and then the resilient container is stretched over the bottom of the filter. The sheath is then unrolled toward the top of the filter, which can then be further loosened to allow oil to drain into the sheath and into the sheath reservoir. After the oil has stopped dripping from the filter, the filter can be fully removed from the engine, and then the sheath is further unrolled beyond the top of the oil filter and closed to encase the oil filter and captured oil. Then, the sheath and its contents can be disposed of in an environmentally safe manner.

DETAILED DESCRIPTION

Figure 1:
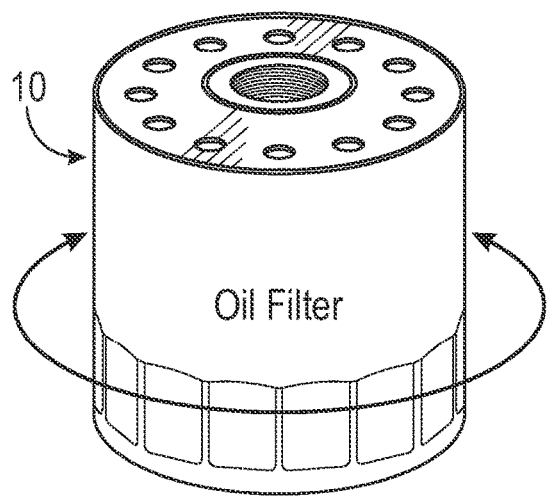
FIG. 1 shows an embodiment of a conventional oil filter for an internal combustion engine.

An oil filter is designated in the drawings by the reference numeral 10. The oil filter 10 is conventional and can take shapes other than that shown in FIG. 1 and can have various sizes.

Figure 6:
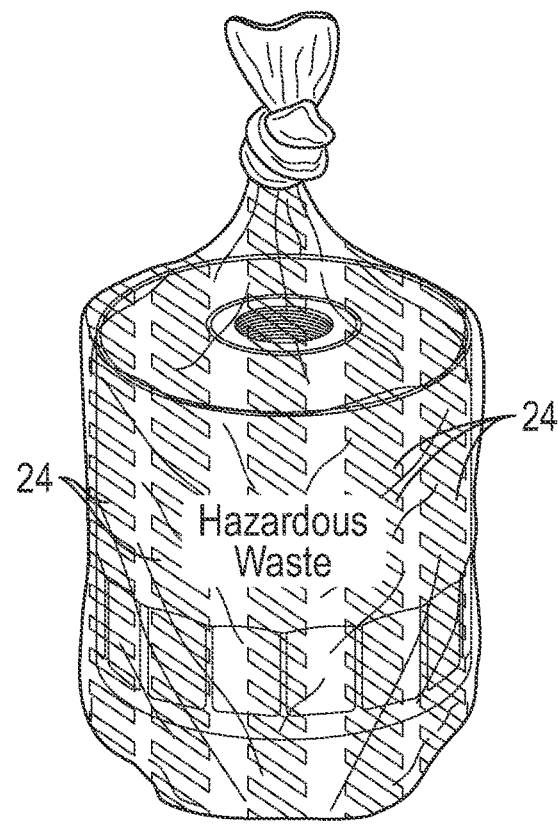
FIG. 6 shows the sheath fully unrolled and tied shut to enclose the filter.
Figure 7:
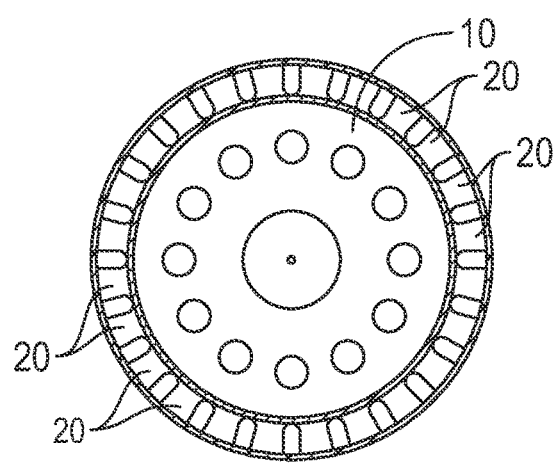
FIG. 7 is a sectional view taken long lines 7-7 of FIG. 3.

A container or sheath 12 is provided for removal and disposal of the used oil filter 10. The sheath 12 is formed as an integral one-piece body, and includes a closed bottom 14, a cylindrical sidewall 16, and an open top 18. The sheath 12 is made of a resilient or stretchable material so that the sidewall 16 can be rolled down and unrolled up. The sidewall 16 of the sheath 12 includes internal channels 20 which allow used oil to drain towards a reservoir 22 in the bottom 14 of the sheath. The exterior of the sidewall 16 may be smooth or textured, or have ribs, nubs or other protrusions 24 to enhance the grip of the sheath 12 by a person during removal of the oil filter 10 from an engine. The channels 20 generally extend longitudinally downwardly to the reservoir 22, while the protrusions 24 may have various patterns or directions or shapes to improve the grip of the sheath 12 on the filter 10. In one embodiment, the sidewall 16 of the sheath 12 is corrugated so as to form the internal channels 20 and the external gripping ribs 24. The unrolled sheath 12 has a height greater than the height of the oil filter 10, as seen in FIG. 6.

Figure 5:
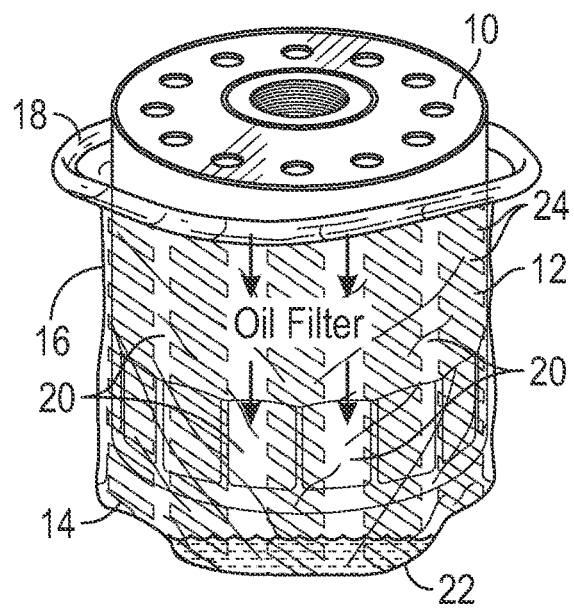
FIG. 5 is a view similar to FIG. 3 showing oil draining downwardly along the sheath channels to the lower sheath reservoir.

The upper end of the sidewall 16, adjacent the open top 18, may extend radially outwardly so as to form an enlarged diameter flange or collar adjacent the top of the filter 10, as shown in FIG. 5, to facilitate the capture of leaking or dripping oil when the filter 10 is loosened.

Figure 2:
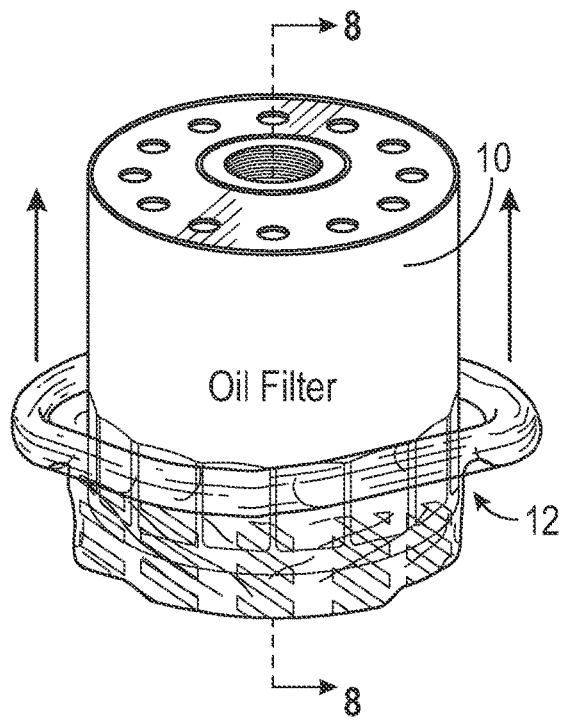
FIG. 2 shows the sheath of the present invention in a position on the bottom of the oil filter.
Figure 3:
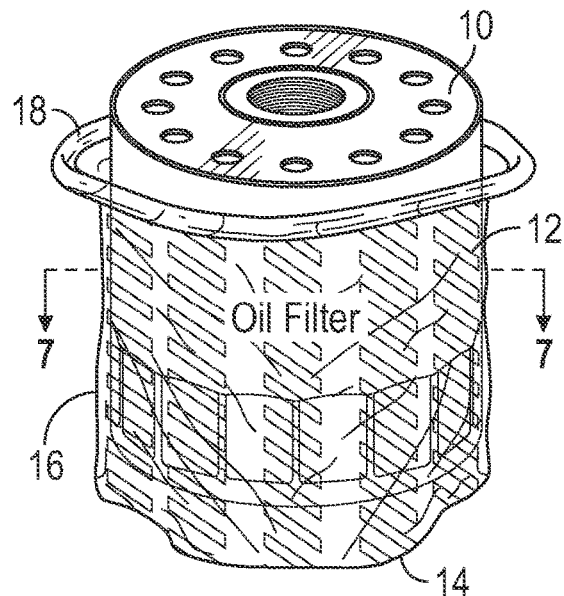
FIG. 3 shows the sheath rolled upwardly along the oil filter.
Figure 4:
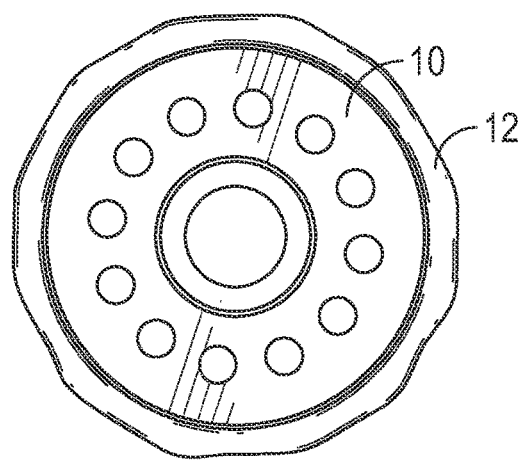
FIG. 4 is a top plain view of the sheath and oil filter shown in FIG. 3.
Figure 8:
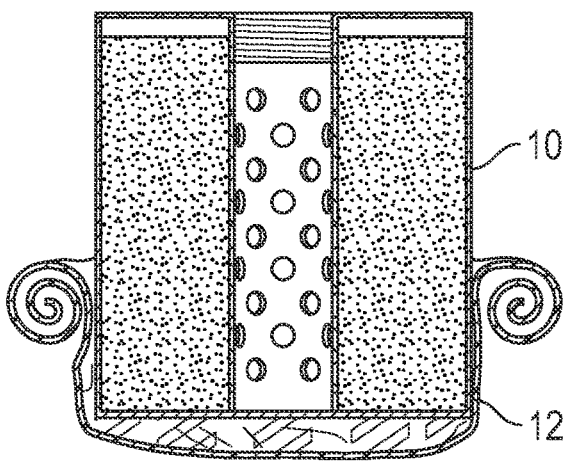
FIG. 8 is a sectional view taken along lines 8-8 of FIG. 2.

To start the oil change process, the filter 10 is cracked loose in any convenient manner, from its normal operating installation on the engine. Preferably, the filter 10 is loosened before the sheath 10 is installed on the filter. The sheath 12 is initially in a rolled configuration, as shown in FIGS. 2 and 8, such that the sidewall 16 can be stretched around the bottom of the filter 10. The sidewall 16 is then rolled upwardly along the filter 10 to a position adjacent the top of the filter 10, as shown in FIGS. 3 and 5. The filter 10 can then be further loosened to allow oil to drain into the sheath 12 and funnel downwardly along the channels 20 into the reservoir 22. When the oil stops dripping from the filter 10 and the engine, the filter can be completely removed from the engine. Then, the sidewall 16 of the sheath 12 can be unrolled further, beyond the top of the oil filter, as shown in FIG. 6. Then the top of the sheath 10 can be knotted or tied using any convenient mechanism, such as a zip tie, string, or twine so as to close the sheath 12 and enclose or encase the filter 10. Preferably, the oil filter 10 inside the sheath 12 is maintained in an upright orientation until the sheath is closed. The sheath 12 and its contents can then be disposed in an environmentally acceptable manner.

Thus, the sheath 12 creates a container for the used filter and oil. The sheath material is flexible and stretchable, yet tough, tear resistant, and compatible with petroleum products, and functional over a wide range of temperatures. The sheath or container 12 eliminates messy oil spills and provides a safe transport of the oil filter and used oil to a disposal location.

The resiliency and stretch ability of the sheath material allows the sheath 12 to fit various different filters within a range of sizes. The sheath 12 can be used in a shop environment, or alternatively, in the field or at the job site. The containment sheath makes maintenance and repairs easier, quicker, safer, and more environmentally sound.

It is understood that the sheath can be used on other types of filters, such as a fuel filter, which require periodic changing.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A system for removing a used oil filter without spilling oil comprising in combination:
   a cylindrical oil filter; and
   a stretchable rolled containment sheath having a sidewall including generally longitudinally extending internal channels which allow used oil to drain towards a reservoir in a bottom of the sheath;
   wherein the containment sheath is enclosingly unrolled about the cylindrical oil filter beyond a length of the cylindrical oil filter such that the containment sheath will capture any oil leaking or dripping from the oil filter as the oil filter is removed from an engine, said internal channels permitting flow of any leaking or dripping oil along the length of the cylindrical oil filter to said reservoir when said containment sheath is unrolled about said cylindrical oil filter.

2. The of system of claim 1 wherein the sidewall has an upper end with an enlarged diameter for positioning adjacent a top of the oil filter to facilitate funneling of oil toward the channels.

3. The system of claim 1 wherein the sidewall is externally textured to facilitate gripping.

4. The system of claim 1 wherein the sidewall has exterior protrusions for gripping.

* * * * *